United States Patent [19]
Danknick

[11] Patent Number: 6,021,429
[45] Date of Patent: Feb. 1, 2000

[54] NETWORK DEVICE WHICH MAINTAINS A LIST OF DEVICE ADDRESSES

[75] Inventor: Dan Danknick, Orange, Calif.

[73] Assignee: Canon Information Systems, Inc., Irvine, Calif.

[21] Appl. No.: 08/749,629

[22] Filed: Nov. 18, 1996

[51] Int. Cl.[7] .............................. G06F 12/06; G06F 13/38
[52] U.S. Cl. .............................. 709/208; 710/9; 709/250; 709/245
[58] Field of Search .................. 395/200.53, 200.54, 395/200.38, 200.39, 200.48, 200.67, 200.75, 200.79, 200.8, 200.83, 823, 824, 828, 829, 835, 840, 200.52; 709/218, 219, 208, 209, 223, 224, 247, 249, 250, 253; 710/3, 4, 8, 9

[56] References Cited

U.S. PATENT DOCUMENTS

| | | | |
|---|---|---|---|
| 5,140,585 | 8/1992 | Tomikawa | 370/60.1 |
| 5,185,860 | 2/1993 | Wu | 395/200 |
| 5,287,103 | 2/1994 | Kasprzyk et al. | 340/825.52 |
| 5,304,992 | 4/1994 | Harashima | 340/825.52 |
| 5,337,309 | 8/1994 | Faulk, Jr. | 370/60 |
| 5,353,399 | 10/1994 | Kuwamoto et al. | 395/159 |
| 5,542,047 | 7/1996 | Armstrong | 395/200.11 |
| 5,548,722 | 8/1996 | Jalalian | 395/200.1 |
| 5,548,725 | 8/1996 | Tanaka et al. | 395/200.05 |
| 5,550,979 | 8/1996 | Tanaka et al. | 395/200.05 |
| 5,588,119 | 12/1996 | Vincent et al. | 395/200.15 |
| 5,604,869 | 2/1997 | Mincher et al. | 395/200.2 |
| 5,615,389 | 3/1997 | Mayfield et al. | 395/828 |
| 5,668,952 | 9/1997 | Slane | 395/200.75 |
| 5,687,320 | 11/1997 | Wiley et al. | 395/200.16 |
| 5,706,210 | 1/1998 | Kumano et al. | 364/514 |
| 5,727,157 | 3/1998 | Orr et al. | 395/200.54 |
| 5,751,967 | 5/1998 | Raab et al. | 395/200.58 |
| 5,754,767 | 5/1998 | Ruiz | 395/200.5 |
| 5,774,667 | 6/1998 | Garvey et al. | 395/200.52 |
| 5,802,300 | 9/1998 | Tanaka et al. | 395/200.52 |
| 5,838,907 | 11/1998 | Hansen | 395/200.5 |
| 5,845,081 | 12/1998 | Rangarajan et al. | 395/200.54 |

OTHER PUBLICATIONS

"HP Forms Internet Solutions Operation", Hewlett–Packard Printing & Imaging News (visited Nov. 6, 1996) <http:/www–dmo.external.hp.com/peripherals/press/news/96jul15.html> (2 pages).

HP Unveils Strategy for Future of Printer Management, Hewlett–Packard Company (1995) (3 pages).

Tektronix PhaserLink Software: Web–Powered Print Administration and Support, Tektronix, Inc., Jan. 8, 1996 (1 page).

"PhaserLink Software: East access to your printer's information", Tektronix, Inc., Jan. 8, 1996, (7 pages).

"PhaserLink Demo", Tektronix, Inc. (visited Nov. 6, 1996) <http:/www.tek.com/Color_Printers/support/demo.html> (3 pages).

"PhaserLink for the Phaser 340: Current status for printer named Monterey/Wasatch", Tektronix, Inc. (visited Nov. 6, 1996) <http://www.tek.com/Color_Printers/support/demo340/button_status.html> (1 page).

(List continued on next page.)

Primary Examiner—Frank J. Asta
Assistant Examiner—Marc D. Thompson
Attorney, Agent, or Firm—Fitzpatrick, Cella, Harper & Scinto

[57] ABSTRACT

A method controls a network device on a local area network (LAN) to operate as a list manager which maintains a list of device addresses for the LAN, and to operate as a slave which provides a device address of the network device to a list manager. The method comprises the steps of determining whether a list manager is operating on the LAN, controlling the network device to operate as a slave on the LAN when the determining step determines that a list manager is operating on the LAN, and controlling the network device to operate as the list manager for the LAN when the determining step determines that no list manager is operating on the LAN.

54 Claims, 10 Drawing Sheets

OTHER PUBLICATIONS

"PhaserLink for the Phaser 340: View and Configure Settings for printer named Monterey/Wasatch", Tektronix, Inc. (visited Nov. 6, 1996) <http://www.tek.com/Color_Printers/support/demo340/button_config.html> (1 page).

"PhaserLink for the Phaser 340: Help Page for Printer named: Monterey/ Wasatch", Tektronix, Inc. (visited Nov. 6, 1996) <http://www.tek.com./Color_Printers/support/demo340/button_help.html> (1 page).

"PhaserLink for the Phaser 340: Reference Links for printer named: Monterey/Wasatch", Tektronix, Inc. (visited Nov. 6, 1996) <http://www.tek.com/Color_Printers/support/demo340/button_reference. html> (1 page).

"Cool Stuff to Print!", Tektronix, Inc. (visited Nov. 6, 1996) <http://www.tek.com/Color_Printers/cool_stuff.html> (1 page).

"PhaserLink for the Phaser 340: View and Configure Information Forwarding for printer named: Monterey/Wasatch", Tektronix, Inc. (visited Nov. 6, 1996) <http://www.tek.com/Color_Printers/support/demo340/config_info_forwarding.html> (1 page).

"PhaserLink for the Phaser 550: Current Status for printer named: Ventura/Juab", Tektronix, Inc. (visited Nov. 6, 1996) <http://www.tek.com/Color_printers/support/demo550/button_status.html> (1 page).

"PhaserLink for the Phaser 550: View and Configure Settings for printer named: Ventura/Juab", Tektronix, Inc. (visited Nov. 6, 1996) <http://www.tek.com/Color_Printers/support/demo550/button_config.html> (1 page).

"PhaserLink for the Phaser 550: Help Page for printer named: Ventura/Juab", Tektronix, Inc. (visited Nov. 6, 1996) <http://www.tek.com/Color_Printers/support/demo550/button_help.html> (1 page).

"PhaserLink for the Phaser 550: Reference Links for printer named: Ventura/Juab", Tektronix, Inc. (visited Nov. 6, 1996) <http://www.tek.com/Color_Printers/support/demo550/button_reference.html> (1 page).

"Tektronix Continues Strong Leadership in the Color Laser–Class Printer Market", Tektronix, Inc. (visited Nov. 6, 1996) <http://www.tek.com/Color_Printers/whats_new/leadership_release2.html> (3 pages).

"Tektronix PhaserLink Software Leverages Runaway Popularity of WWW", Tektronix, Inc. (visited Nov. 6, 1996) <http://www.tek.com/Color_Printers/whats_new/phaserlink_release.html> (3 pages).

"PhaserLink Software: Web–Powered Print Administration and Support", Tektronix, Inc. (visited Jul. 31, 1996) <http://www.tek.com/Color_Printers/products/phaserlink.html> (3 pages).

"PhaserLink Software: Your Printer's Information Link", Tektronix, Inc. (visited Nov. 6, 1996) <http:/www.tek.com/Color_Printers/support/phaserlink.htm> (pp. 2 and 3 only).

"Printer parameters available through PhaserLink", Tektronix, Inc. (visited Nov. 6, 1996) <http://www.tek.com/Color_Printers/support/ph–link–params.htm> (1 page).

View and Configure PhaserShare Card Settings, Tektronix, Inc. (visited Nov. 6, 1996) <http://www.tek.com/Color_Printers/ . . . ph–params/PhaserShareSettings.htm> (1 page).

"View and Configure PhaserShare Card Settings (Token Ring Card)", Tektronix, Inc. (visited Nov. 6, 1996) <http://www.tek.com/Color_Printers/ . . . t/ph–params/TokenRingSettings.htm> (3 pages).

"View and Configure EtherTalk Settings", Tektronix, Inc. (visited Nov. 6, 1996) <http://www.tek.com/Color_Printers/ . . . t/ph–params/EtherTalkSettings.htm> (1 page).

"View and Configure NetWare Print Server Settings", Tektronix, Inc. (visited Nov. 6, 1996) <http://www.tek.com/Color_Printers/support/ph–params/NetWare Settings.htm> (5 pages).

"View and Configure NetWare TCP/IP Settings", Tektronix, Inc. (visited Nov. 6, 1996) <http://www.tek.com/Color_Printers/support/ph–params/TCPIPSettings.htm> (2 pages).

"View and Configure LPR Settings", Tektronix, Inc. (visited Nov. 6, 1996) <http://www.tek.com/Color_Printers/support/ph–params/LPRSettings.htm> (2 pages).

"View and Configure AppSocket Settings", Tektronix, Inc. (visited Nov. 6, 1996) <http://www.tek.com/Color_Printers/ . . . t/ph–params/AppSocketSettings.htm> (3 pages).

"View and Configure Syslog Settings", Tektronix, Inc. (visited Nov. 6, 1996) <http://www.tek.com/Color_Printers/support/ph–params/SyslogSettings.htm< (1 page).

"View and Configure SNMP Settings", Tektronix, Inc. (visited Nov. 6, 1996) <http://www.tek.com/Color_Printers/support/ph–params/SNMPSettings.htm> (1 page).

"View and Configure Parallel Port Settings", Tektronix, Inc. (visited Nov. 6, 1996) <http://www.tek.com/Color_Printers/ . . . rtph–params/ParallelSettings.htm> (3 pages).

"Xerox Sets Direction For Internet Web–Based Printing", PR Newswire, p. 0618NYTU024, Jun. 18, 1996 (from Dialog search) (2 pages).

"JetAdmin to let users manage HP's printers over the Web", InfoWorld Publishing Company, p. 12, Jul. 15, 1996 (from Dialog search) (1 page).

"IBM introduces family of open workgroup printers; aggressively expands printer line with four inexpensive, feature–rich network printers", Business Wire, p. 06181220, Jun. 18, 1996 (from Dialog search) (3 pages).

"NDPS cures today's printing woes, but lacks longevity", PC Week, p. N03, Jul. 15, 1996 (from Dialog search) (2 pages).

"Pacific Data Products Unveils DirectNet Web Software . . . ", Business Wire, p. 01220030, Jan. 22, 1996 (from Dialog search) (1 page).

| LIST OF DEVICE ADDRESSES | TYPE OF DEVICE | MANUFACTURER |
|---|---|---|
| 146 . 184 . 24 . 51 : 25 | PRINTER | CANON |
| 153 . 199 . 31 . 42 : 641 | PRINTER | CANON |
| 177 . 182 . 35 . 61 : 87 | FACSIMILE | CANON |
| 248 . 917 . 73 . 44 : 8862 | COPIER | CANON |
| 572 . 531 . 86 . 23 : 767 | PRINTER | CANON |
| 643 . 712 . 54 . 15 : 66 | FACSIMILE | CANON |
| 336 . 147 . 22 . 62 : 913 | COPIER | CANON |
| 458 . 344 . 81 . 73 : 522 | COPIER | CANON |
| 782 . 613 . 77 . 45 : 31 | FACSIMILE | CANON |
| 648 . 359 . 21 . 62 : 778 | PRINTER | CANON |
| 962 . 444 . 61 . 48 : 2125 | FACSIMILE | CANON |
| 346 . 715 . 83 . 39 : 41 | PRINTER | CANON |
| 535 . 417 . 26 . 22 : 54 | PRINTER | CANON |
| 965 . 787 . 40 . 19 : 76 | PRINTER | CANON |
| 215 . 123 . 10 . 28 : 70 | COPIER | CANON |
| 922 . 194 . 33 . 53 : 43 | FACSIMILE | CANON |

FIG. 8

NETWORK DEVICE WHICH MAINTAINS A LIST OF DEVICE ADDRESSES

BACKGROUND OF THE INVENTION

1. Field of the Invention

The present invention relates to a network device which operates in two modes: a list manager mode for maintaining a list of device addresses for devices on the network, and a slave mode for providing a device address of the network device to another device on the network which maintains such a list.

2. Description of the Related Art

Originally, local area networks (LANs) relied on a centralized file server to access files on the LAN. Such LANs also used the centralized file server to maintain a list of device addresses for various devices on a network. Through the centralized file server, the various network devices were able to retrieve a device address for a device on the LAN, and access the device using the device address.

More recent LANs, such as those using an IP or a NETBIOS protocol (e.g., the Microsoft® Windows95 network), do not rely on a centralized file server for access to files. While the elimination of a centralized file server provides advantages for such LANs, it has also provided at least one drawback. That is, since there is no centralized file server on such a LAN, there is no centralized area on the LAN which stores device addresses for the LAN. As a result, a network device on the LAN may have difficulty retrieving a current address for a device on the LAN.

One conventional solution to the foregoing problem is to provide a centralized address server to maintain a list of device addresses for a LAN. Such a solution is used in the LDAP protocol. This solution, however, introduces an additional file server onto the LAN, thereby increasing both the cost and the complexity of the LAN.

Accordingly, there exists a need for a system of maintaining a list of device addresses for a LAN which does not require the addition of a separate server to the LAN.

SUMMARY OF THE INVENTION

The present invention addresses the foregoing need by controlling a network device on a LAN to operate as a list manager for the LAN, i.e., to maintain a list of device addresses for the LAN, and to operate as a slave on the LAN, i.e., to provide its device address to another device on the LAN which is operating as the list manager. By controlling a device on the LAN to maintain a list of device addresses for the LAN, the present invention is able to alleviate the need for a file server to maintain such a list. Moreover, by controlling the network device to provide its device address to a list manager on the LAN when a list manager is operating on the LAN, the invention provides a means of updating the list of device addresses as necessary.

Thus, according to one aspect, the present invention is a system, i.e., a method, an apparatus and computer-executable process steps, for controlling a network device on a LAN to operate as a list manager by maintaining a list of device addresses for the LAN, and to operate as a slave by providing its device address to a list manager on the LAN. The system determines whether a list manager is operating on the LAN, and controls the network device to operate as a slave on the LAN when it is determined that a list manager is operating on the LAN. The system controls the network device to operate as the list manager for the LAN when it is determined that no list manager is operating on the LAN.

By controlling the network device to operate as the list manager when no other list manager is operating on the LAN, the present invention is able to maintain a current list of device addresses for the LAN. Along these lines, by controlling the network device to provide its device address to a list manager already operating on the LAN when it is determined that a list manager is already operating on the LAN, the present invention provides a means for updating a currently-existing list to include a device address of a new network device.

In preferred embodiments of the invention, when the network device is controlled to operate as the list manager, the system determines whether a second list manager is operating on the LAN and, in a case that a second list manager is operating on the LAN, resolves contention between the second list manager and the network device operating as list manager.

By determining whether a second list manager is operating on the LAN and resolving contention between the second list manager and the network device operating as list manager, the present invention reduces confusion which may result from two list managers operating on the LAN concurrently.

In preferred embodiments of the invention, the system determines whether a list manager is operating on the LAN by broadcasting a request for the list manager on the LAN and waiting for a response. In these embodiments, when it is determined that a list manager is operating on the LAN, the system re-broadcasts the request for the list manager periodically, via the network device, in order to determine whether the list manager is still operating. Thereafter, the system determines, after each re-broadcast of the request, whether a new list manager is operating on the LAN and, in a case that a new list manager is operating, provides the device address of the network device to the new list manager. By providing its device address to a new list manager in a case that a new list manager is operating on the LAN, a network device using the present invention is able to ensure that its device address will be on the list of device addresses even if the identity of the list manager changes.

Moreover, in the present invention, in response to a request for a list manager, the list manager provides a call-back time period. The system re-broadcasts the request for the list manager at a frequency corresponding to the call-back time period provided by the list manager. Preferably, the call-back time period increases proportionally to an increase in a number of device addresses in the list of device addresses maintained by the list manager.

By providing a call-back time period which corresponds to a number of device addresses in a list maintained by a list manager, the present invention is able to limit the frequency of responses that the list manager must make in response to re-broadcasts for a list manager. As a result, the list manager has more time for its other tasks.

According to another aspect, the present invention is a system, i.e., a method, an apparatus, and computer-executable process steps, for providing a device address of a network device on a LAN to a list manager on the LAN, the list manager maintaining a list of device addresses for the LAN. The system includes broadcasting a request for a list manager over the LAN, and receiving a response from the list manager over the LAN in response to the request. The system provides the device address of the network device to the list manager over the LAN. The list manager adds the device address of the network device to the list of device addresses maintained by the list manager.

By providing the device address of the network device to the list manager, the present invention is able to include the device address of the network device on a most current list of device addresses in the list manager. A network peripheral or the like may then access the network device using the list of device addresses obtained from the list manager.

In preferred embodiments of the invention, the system includes waiting a predetermined period of time for a response from the list manager after the request for the list manager has been broadcasted over the LAN, and repeating the broadcasting and the waiting until the response from the list manager is received.

According to still another aspect, the present invention is a system, i.e, a method, an apparatus, and computer-executable process steps, for controlling a network device on a LAN to maintain a list of device addresses for the LAN. The system confirms that no other device on the LAN is maintaining a list of device addresses for the LAN, stores a device address of the network device in a list of device addresses on the network device, and monitors the LAN via the network device for requests for the list manager. The system responds to requests on the LAN for the list manager by identifying the network device as the list manager, receives device addresses directed to the list manager over the LAN, and stores received device addresses in the list of device addresses in a memory on the network device.

According to still another aspect, the present invention is a system, i.e., a method, an apparatus, and computer-executable process steps, for providing a peripheral on a LAN with a list of device addresses for the LAN. The list of device addresses is stored in a list manager on the LAN. The system includes broadcasting a request over the LAN for the list manager, receiving, over the LAN, a response to the request from the list manager, broadcasting a request over the LAN for the list of device addresses in the list manager, and receiving the list of device addresses from the list manager over the LAN in response to the request for the list of device addresses.

In preferred embodiments of the invention, the system includes displaying the list of device addresses to a user via a display on the peripheral, and/or converting the device addresses in the list of device addresses to a readable form prior to displaying the list of device addresses.

In particularly preferred embodiments of the invention, each of the device addresses in the list of device addresses includes corresponding device identification information. In these embodiments, the system converts the device identification information for each of the device addresses into a readable form, and displays the converted device identification information to a user.

By displaying a list of device addresses received from a list manager to a user, the present invention facilitates a user's access to various devices/peripherals on a LAN. To this end, preferred embodiments of the invention include communicating, via the peripheral, with devices on the LAN having predetermined device identification information using the list of device addresses provided by the list manager.

This brief summary has been provided so that the nature of the invention may be understood quickly. A more complete understanding of the invention can be obtained by reference to the following detailed description of the preferred embodiment in connection with the attached drawings.

BRIEF DESCRIPTION OF THE DRAWINGS

FIG. 8 shows a list of device addresses, provided by the network device of the present invention as stored in a memory.

DETAILED DESCRIPTION OF THE PREFERRED EMBODIMENT

The present invention is embodied in a network device which is capable of receiving and processing data from a LAN and of transmitting data to the LAN. Such a device can include a network interface device which interfaces a peripheral to the network, or even the peripheral itself.

Specifically, the invention is a network device on a LAN, which operates as a list manager for the LAN by maintaining a list of device addresses for the LAN, and which operates as a slave on the LAN by providing a device address to another device on the LAN operating as the list manager. The network device includes a memory which stores a device address of the network device and process steps for execution by a processor, and which can store the list of device address for the LAN, a LAN interface which interfaces to the LAN, over which communications are transmitted to an received from the LAN, and a processor which executes the process steps stored in the memory (1) to determine whether a list manager is operating on the LAN, (2) to control the network device to operate as a slave on the LAN when the processor determines that a list manager is operating on the LAN, and (3) to control the network device to operate as the list manager for the LAN when the processor determines that no list manager is operating on the LAN.

Network Architecture

Figure 1:
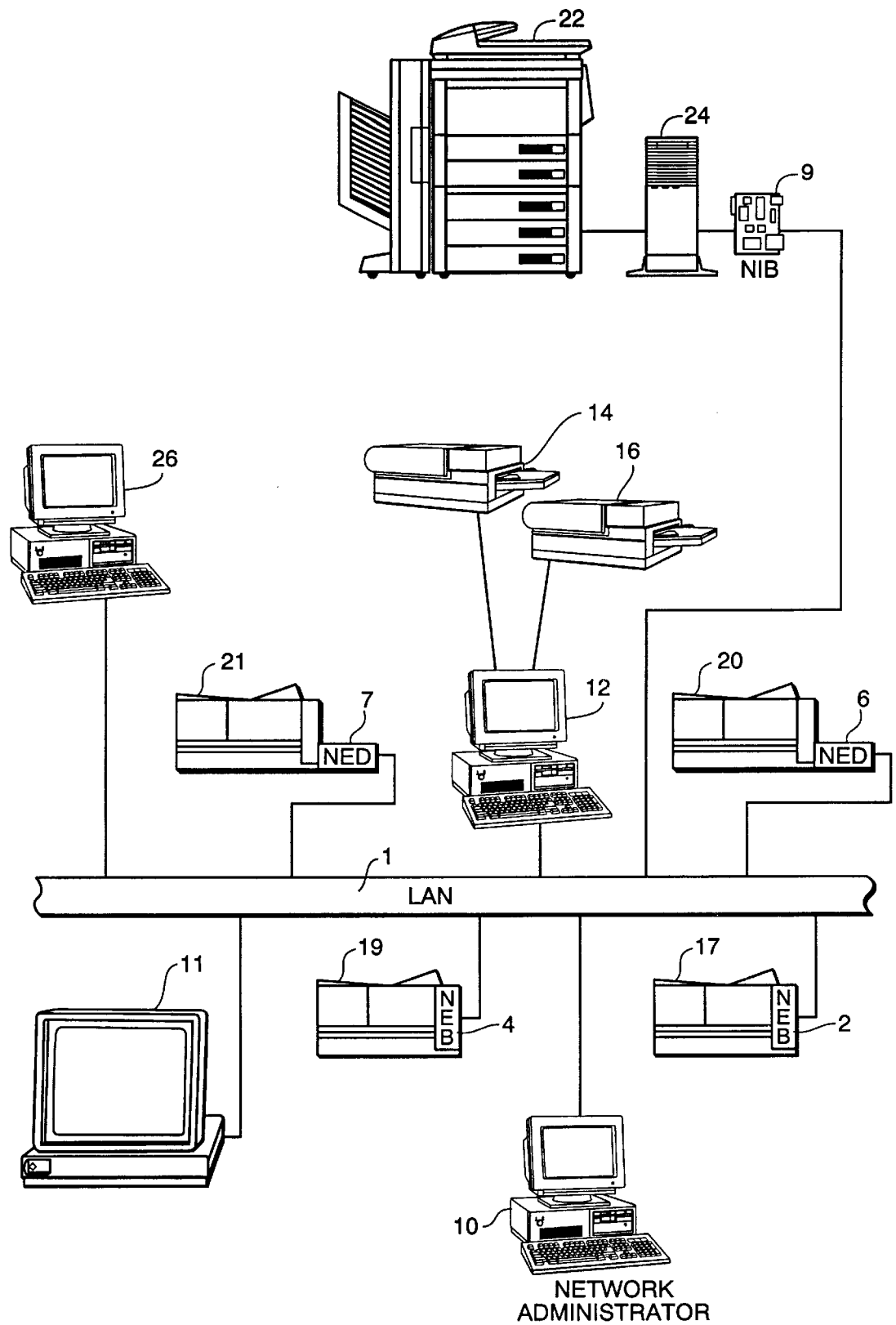
FIG. 1 is a diagram of a LAN which includes network devices that embody the present invention.

FIG. 1 is a diagram of heterogeneous LAN 1, which includes network devices that embody the present invention. These network devices include network expansion boards (NEBs) 2 and 4 and network expansion devices (NEDs) 6 and 7 (examples of which are described in co-pending U.S. patent application Ser. No. 08/489,116, filed Jun. 9, 1995, entitled "outputting A Network Device Log File") and network interface board (NIB) 9 (an example of which is described in co-pending U.S. patent application Ser. No. 08/409,034, filed Mar. 23, 1995, entitled "Network Interface Board For Digital Copier").

Typically, a LAN such as LAN 1 services a fairly localized group of users such as a group of users on one floor or contiguous floors of a building. As users become more remote from one another, for example, in different buildings or different states, a wide area network (WAN) (not shown)

may be created which is essentially a collection of several LANs all connected by high speed digital lines, such as high speed integrated services digital network (ISDN) telephone lines. Additionally, LAN 1 may be connected to an external network, such as the World Wide Web, via a modem link or the like (not shown).

In FIG. 1, LAN 1 is depicted as an Ethernet medium which has a bus-type architecture, but a Token-ring medium having a ring-type architecture can be used as well. Connected to LAN 1 are personal computer (PC) 10, which serves as a network administrator's computer, UNIX workstation 11, and PC 12, which may serve as a print server for printers 14 and 16. In LAN 1, NEB 2 allows shared access to printer 17, NEB 4 allows shared access to printer 19, NED 6 allows shared access to printer 20, NED 7 allows shared access to printer 21, and NIB 9 allows shared access to copier 22 via multiple device controller (MDC) 24. Additional workstations and peripherals of the type described above, such as PC 26, may be added to LAN 1 as well.

As indicated above, the present invention may be embodied in any type of network device, such as NEB 2, NEB 4, NED 6, NED 7, and NIB 9 mentioned above. In this regard, the present invention is preferably embodied in all network devices on LAN 1, i.e., in each of NEB 2, NEB 4, NED 6, NED 7, NIB 9, and PC 26, since, as described below, the present invention relies on intercommunication between the network devices on LAN 1. Additionally, the present invention is utilized in connection with a network peripheral, such as PC 26, in the manner described below.

A preferred embodiment of the present invention is described below in the context of NEB 2. However, as noted above, the present invention may be embodied in any and all of the foregoing network devices.

NEB Architecture

Broadly speaking, NEB 2 is an interactive network device which couples printer 17 to LAN 1, making printer 17 a responsive and interactive network member. NEB 2 receives print data, status requests, and control commands from LAN 1, transmits print data, status requests, and control commands to printer 17 for execution, and transmits status information back to LAN 1. Thus, NEB 2 can perform not only remote printer services and print server functionalities, but can also offer to network members whatever status and control features are available from the peripheral interface.

Figure 2:
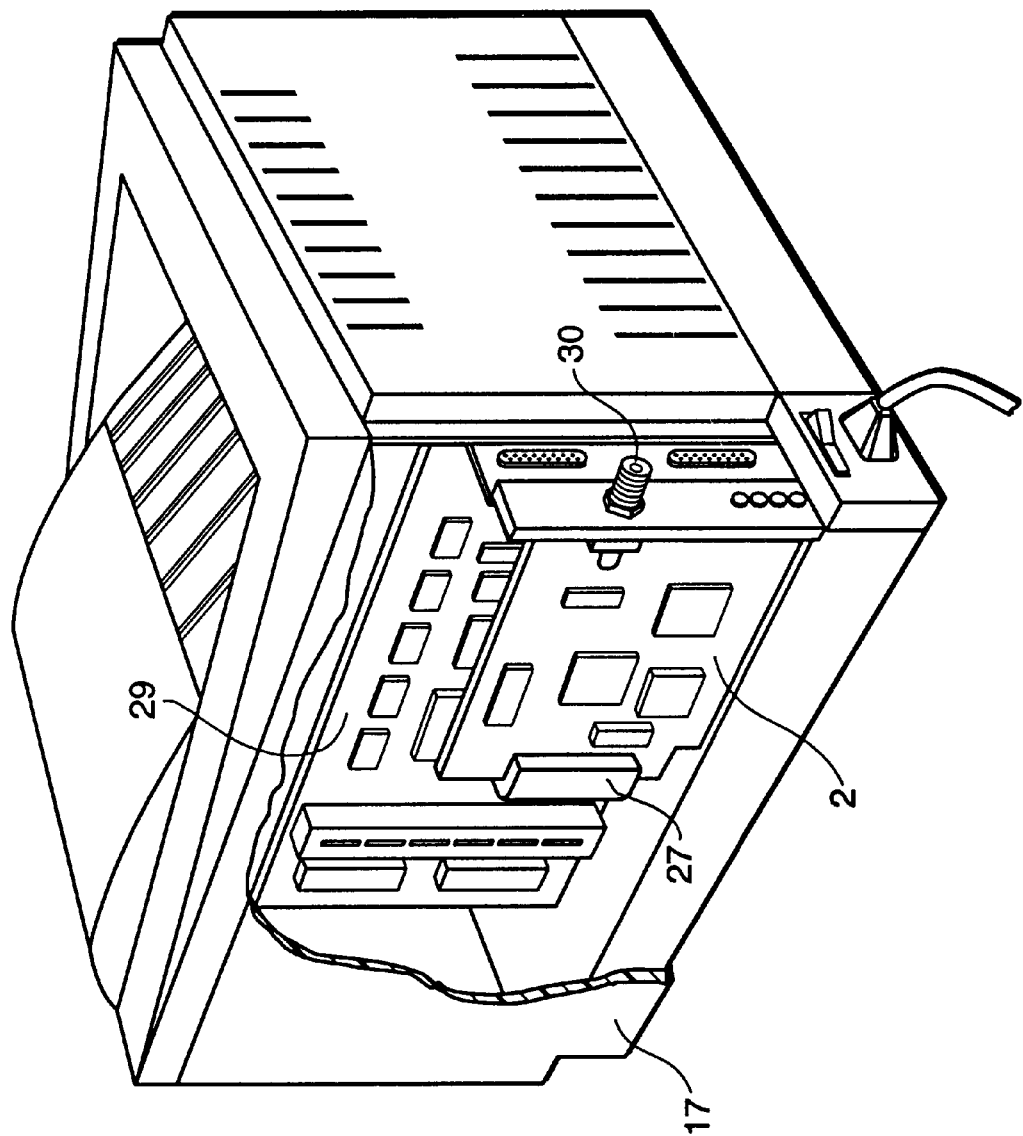
FIG. 2 is a cut away perspective of a network device which embodies the present invention.

FIG. 2 is a cut-away perspective view showing installation of NEB 2 into printer 17. As shown in FIG. 2, NEB 2 is preferably housed in an internal expansion I/O slot of printer 17, which in a preferred embodiment of the present invention is a Canon LBP 1260 laser printer. This makes NEB 2 an embedded network node having the processing and data storage features described below.

As also shown in FIG. 2, NEB 2 is connected via peripheral connector 27 to printer interface card 29. Printer interface card 29 directly controls the print engine in printer 17. Print data and printer status commands are fed to printer interface card 29 from NEB 2 via peripheral connector 27, and printer status information and statistics, e.g., number of pages printed, signals indicating end times of print jobs, etc., are obtained from printer interface card 29 also via peripheral connector 27. NEB 2 communicates this information onto LAN 1 via LAN connector 30. LAN connector 30 may be either a BNC connector, an RJ-45 connector, or their equivalent. A BNC connector is shown in FIG. 2.

Figure 3:
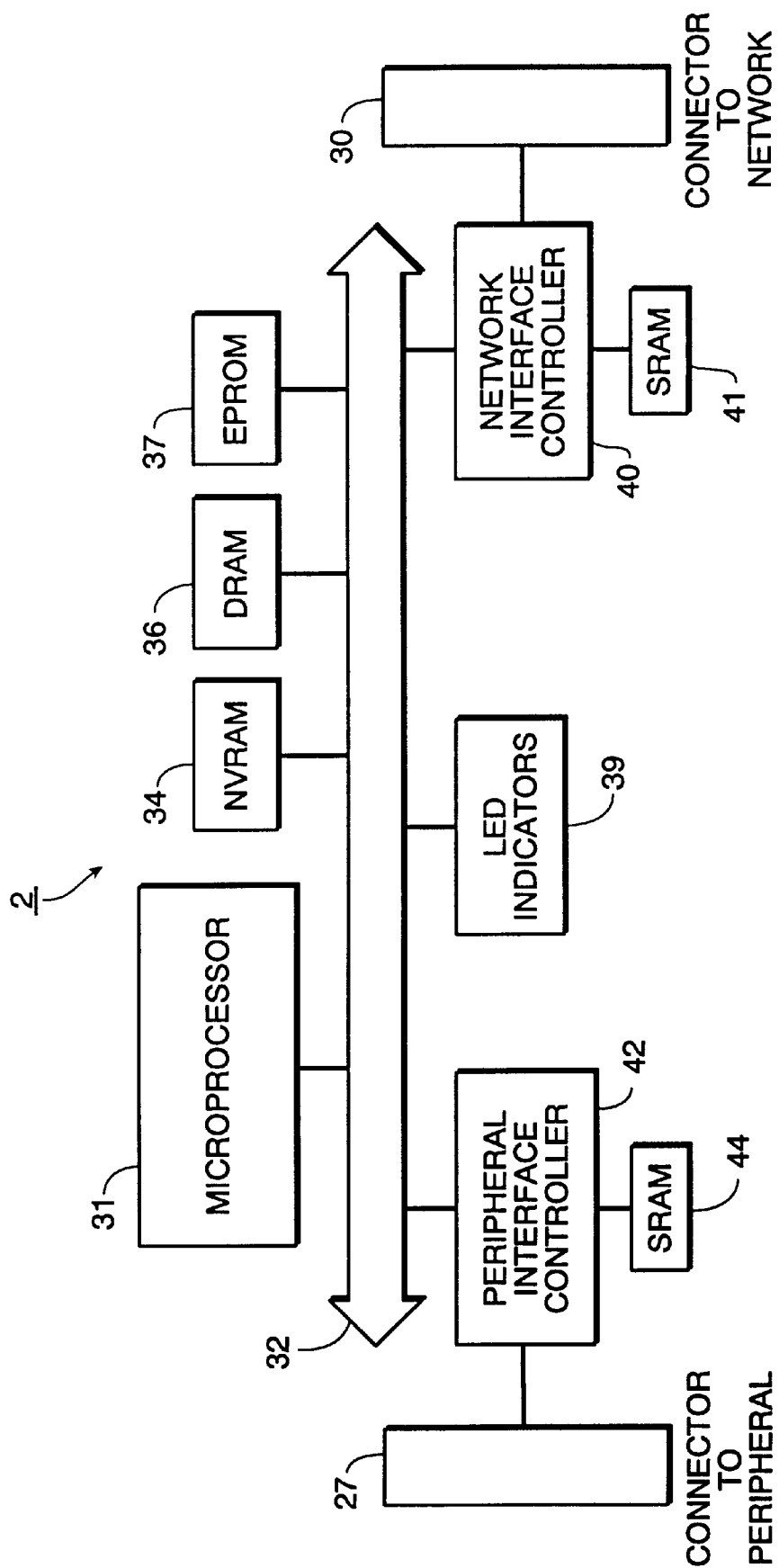
FIG. 3 is a block diagram showing the architecture of a network device which embodies the present invention.

A block diagram of a suitable hardware construction for NEB 2 is shown in FIG. 3. As shown in FIG. 3, NEB 2 includes a central processing unit (CPU) 31, such as an Intel 80C188EA-20 8-bit programmable microprocessor, which is interfaced to computer bus 32. Also interfaced to computer bus 32 is non-volatile RAM (NVRAM) 34, dynamic RAM (DRAM) 36, and electrically erasable programmable read only memory (EPROM) 37. Configuration parameters and other important information that must be stored between power cycles are stored in NVRAM 34. Process steps for the present invention to be executed by microprocessor 31 are stored in EPROM 37, but, in general, before these process steps are executed, they are copied from EPROM 37 into DRAM 36 for execution out of DRAM 36. LED indicators 39 are provided so as to give a user a general indication as to the processing status of NEB 2 and may, for example, include indicator LEDs for power and data communication.

As described above, NEB 2 interfaces between LAN 1 and the printer 17, and is therefore provided with LAN connector 30 for connecting to LAN 1 in addition to peripheral connector 27 for connecting to printer 17. Network interface controller 40, which is connected to computer bus 32 and to network connector 30, provides a hardware interface for capturing and assembling data packets for receipt from and transmission onto LAN 1, and also provides a hardware interrupt to microprocessor 31 so as to signal that LAN data packets have been captured and are available for use by microprocessor 31. Static RAM (SRAM) 41 is provided for network interface controller 40 so as to store, on a temporary basis, such data packets.

On the peripheral side, peripheral interface controller 42, which is connected to computer bus 32 and peripheral connector 27, provides a peripheral interface between NEB 2 and a peripheral, such as printer 17, serviced by NEB 2. Peripheral interface controller 42 may be any of a variety of different controllers and can, for example, be constructed of a bi-directional interface (such as with a SCSI interface, an IEEE-1284 interface, a dual port RAM interface, a shared RAM interface, an IrDA (Infrared Data Association) interface, or the like) or a uni-directional interface (such as a standard Centronics RS-232 interface, or the like). Peripheral interface controller 42 is provided with SRAM 44 for temporary storage of data transmitted to and from NEB 2 and the peripheral serviced by NEB 2.

NEB Software

Software modules executed by microprocessor 31 are stored in EPROM 37. Some low-level modules which are always needed, such as NVRAM read, could be executed directly out of EPROM 37, but for the most part, microprocessor 31 does not execute software modules directly from EPROM 37, but rather selectively loads those modules into DRAM 36 for execution from DRAM 36. This permits flexible configuration of NEB 2 by selection of which modules are to be loaded.

Figure 4:
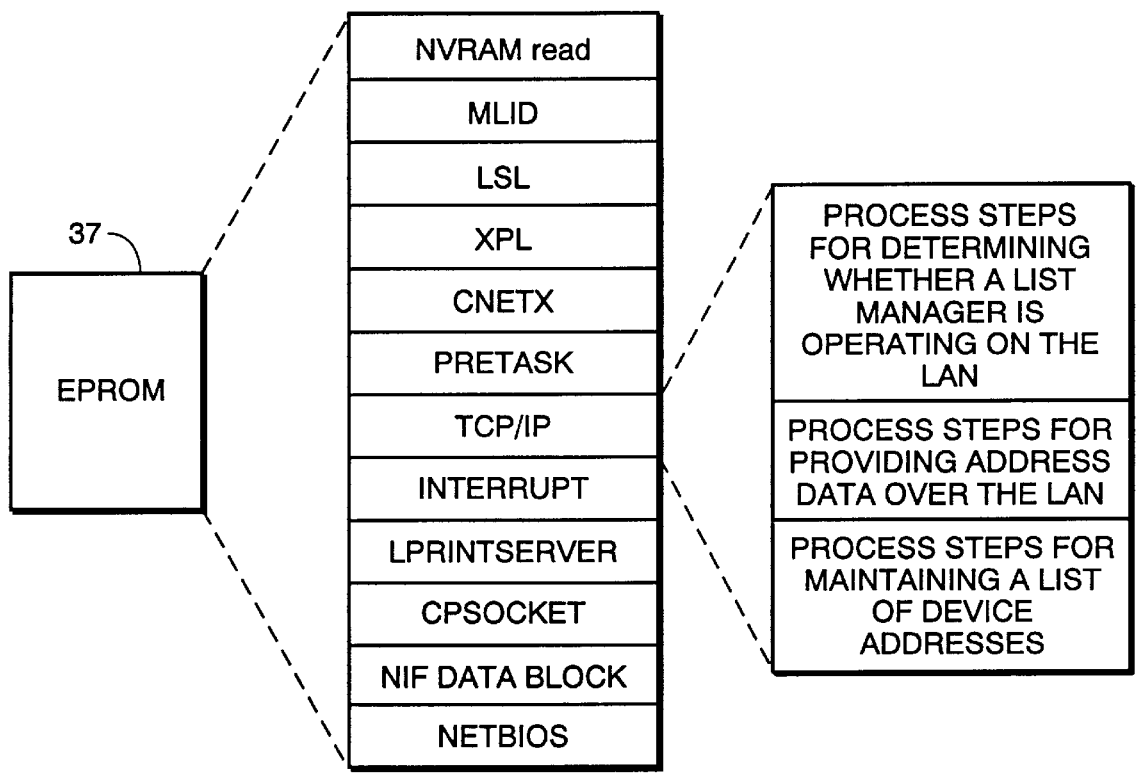
FIG. 4 is a diagram showing examples of software modules stored in EPROM, which are used by the network device of the present invention.

FIG. 4 illustrates examples of blocks of code, or software modules, that are stored in EPROM 37. The XPL module provides a standardized interface between printer 17 and NEB 2. MLID (Multi Link Interface Driver) is a piece of code (Media Support Module, or MSM) linked together with a piece of customized code (Hardware Support Module, or HSM) that is the lowest level of network connection, while LSL (Link Support Layer) is a piece of code that acts as a multiplexer between the low level MLID and the several protocol stacks (e.g., TCP/IP, NETBIOS, etc.) above it. CNETX is customized code that turns local DOS-like function calls into network function calls, providing file functions like OPEN, READ, WRITE, and CLOSE.

The PRETASK module is responsible for identifying what frame types are associated with the various possible protocol stacks. Because NEB 2 supports multiple protocol stacks, such as TCP/IP, NETBIOS, etc., this module exists as long as NEB 2 is running.

The TCP/IP protocol stack has User Datagram Protocol (UDP), Reverse Address Resolution Protocol (RARP) and BootP support within. INTERRUPT is the interrupt handler for the TCP/IP task. LPRINTSERVER is the TCP/IP print server application, and also owns the print data lines for the duration of a print job. The TCP/IP protocol stack contains process steps of the present invention for determining whether a list manager, i.e., a network device which maintains a list of device addresses for LAN 1, is operating on LAN 1, controlling NEB 2 to provide its device address to a list manager when it is determined that a list manager is operating on the LAN, and controlling NEB 2 to operate as the list manager for the LAN when it is determined that no list manager is operating on the LAN. These device addresses can include, but are not limited to, a MAC address of NEB 2, or an E-Mail address of a PC, such as PC 26, in a case that the invention is connected with workstations on LAN 1. Each of the device addresses includes a socket number specific to the present invention. In this regard, an example of a device address which could be in a list maintained by the list manager is "146.184.24.51:25", where "25" is the socket number for the present invention.

The CPSOCKET program runs for all -protocol stacks. The program responds to requests for connection, requests for data download, or requests for services from remote utilities, and provides status and control to other tasks via interprocess communication. Because CPSOCKET typically owns the status and control lines between NEB 2 and printer 17, it is the only task that has the ability to obtain printer status via the status lines. CPSOCKET is responsible for the network connection and packet contents between the UNIX-oriented status and control utilities (CPUTIL), corresponding NETBIOS client-based software utilities for Microsoft® Windows95, and the like. In preferred embodiments, communication between these process steps and LAN 1 may be affected through CPSOCKET; however, it is noted that such communication may take place without the aid of CPSOCKET as well.

Process steps similar to those described above for the TCP/IP protocol stack are stored on each protocol stack in NEB 2, such as the NETBIOS protocol stack, stored in EPROM 37. In this regard, for simplicity's sake, FIG. 4 shows process steps stored on the TCP/IP protocol stack only, and not on any other protocol stacks.

In a preferred embodiment of the present invention, when NEB 2 is controlled to operate as the list manager for LAN 1, NEB 2 maintains a list of device addresses in DRAM 36. By storing the list of device addresses in a volatile memory, which erases the list when the device powers-down, NEB 2 ensures that an up-do-date list of device addresses will be maintained for LAN 1, as described in more detail below. In a case when NEB 2 is controlled to operate as a slave, i.e., NEB 2 is not the list manager, NEB 2 stores a device address of the current list manager for LAN 1 in DRAM 36. Again, this is to ensure that the device address of the most recent list manager is not maintained through power cycles.

Regarding the list of device addresses, a list manager on LAN 1 (which may or may not be NEB 2) maintains a list of device addresses from other devices on LAN 1. The list typically includes device addresses and corresponding device identification information for each device address, although the device identification information need not be included in the list. The device identification information identifies a type of network device, e.g., a printer, a copier, a facsimile machine, etc., for the device at a corresponding address. The device identification information can also identify a manufacturer or any other device-specific identifying features. Examples of device addresses and identification information stored in a memory on NEB 2 are shown in FIG. 8. In addition, the list of device addresses can include an expiration time as well (not shown in FIG. 8). The expiration time lets microprocessor 31 know when a device address in the list of device addresses has expired. In this regard, microprocessor 37 monitors expiration times of device addresses in the list, and based thereon, microprocessor 31 is able to determine when a device address has expired. Thereafter, microprocessor 37 queries a device at the expired address to provide an updated device address, as described in more detail below.

Also stored in EPROM 37 is a network identification file (NIF) data block which stores board-invariant information, which is unique for every network board. This information includes a device address for NEB 2, and can also include device identification information, such as that described above, for NEB 2, and device address expiration time. As described below, in a case that NEB 2 is not designated to be the list manager, NEB 2 will provide the list manager on LAN 1 with information, such as its device address, etc., from the NIF file.

The NIF file also stores hardware configuration data, board revision number and the like, as well as changeable information such as software version number. The information in the NIF data block can be used to ensure that EPROM 37 is not reprogrammed with an incompatible firmware image.

NEB Access and Configuration

To access information available in NEB 2, a program called CPUTIL is resident on LAN 1 (corresponding programs are provided for other environments, such as a NETBIOS environment), usually in a public directory, which can be accessed by network administrator 10 and which allows network administrator 10 to access information contained in NEB 2. The CPUTIL program is capable of interfacing with NEB 2 (and other network members) and of performing such functions as displaying current information for a selected network device, such as its device address, interface information, control information, configuration information and statistics. CPUTIL may also be used to activate or deactivate applications of NEB 2.

In the context of the present invention, CPUTIL can be used to change a list of device addresses stored on a list manager on LAN 1, such as NEB 2. Using CPUTIL, the network administrator can remotely access the list of device addresses in NEB 2, and update the list of device addresses manually, if desired.

CPUTIL communicates with NEB 2 through a special connection with CPSOCKET using a customized client socket. Multiple connections with CPSOCKET are supported. CPSOCKET provides client service transactions such as NEB control, device address/information, basic configuration information, application information, statistics, and logging. For example, CPUTIL can request that an application be configured or request that an already-configured application be activated or deactivated. In the context of the present invention, CPUTIL can be used to force a list manager to discontinue maintaining a list of device addresses. CPSOCKET will insure that the appropriate option (protocol stack) is available and configured for an application before allowing the application itself to be configured. Within NEB 2, the CPSOCKET operational module is always activated.

Controlling the NEB

Figure 5A:
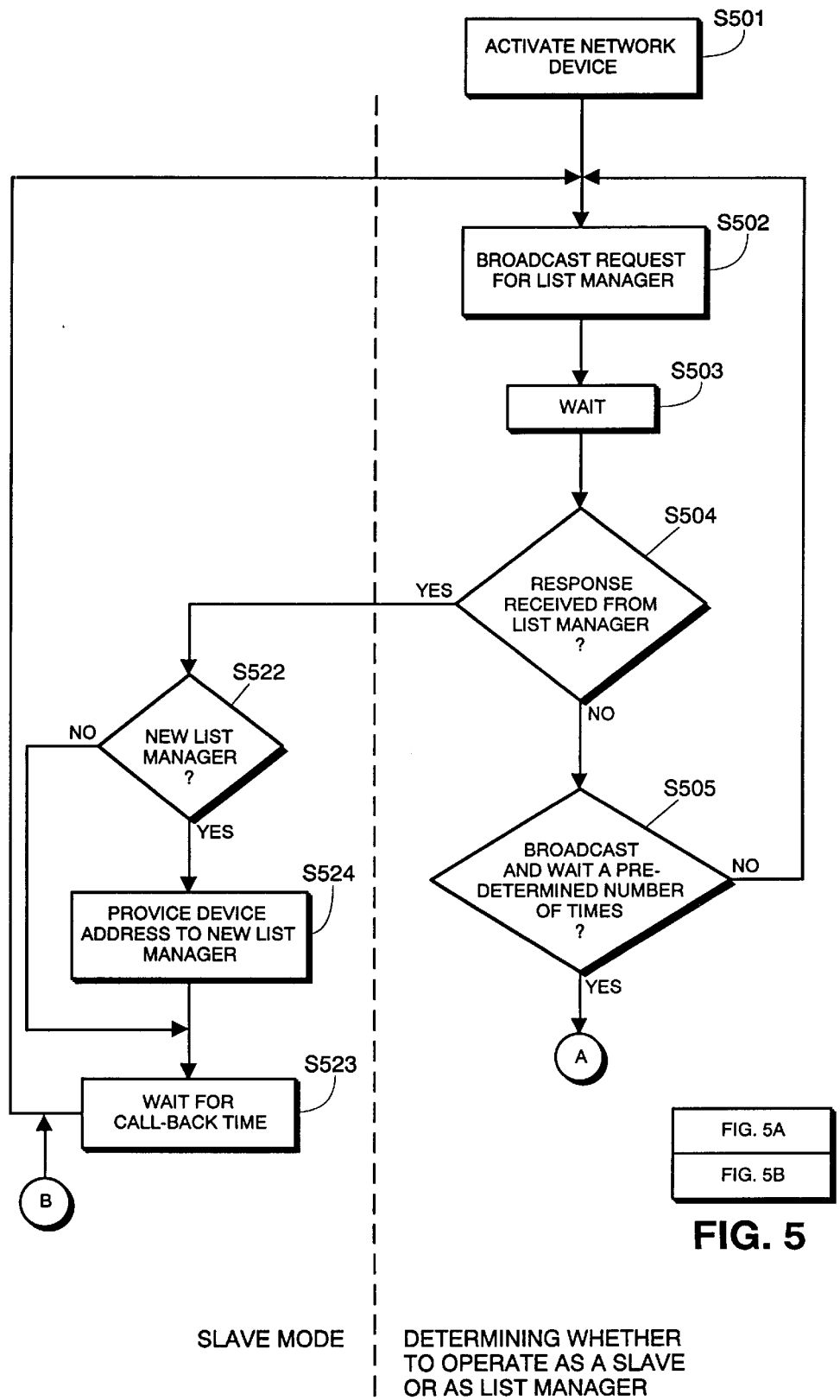
FIG. 5 is a flow diagram showing process steps of the present invention for controlling the network device to operate as either a list manager or a slave on the LAN.
Figure 5B:
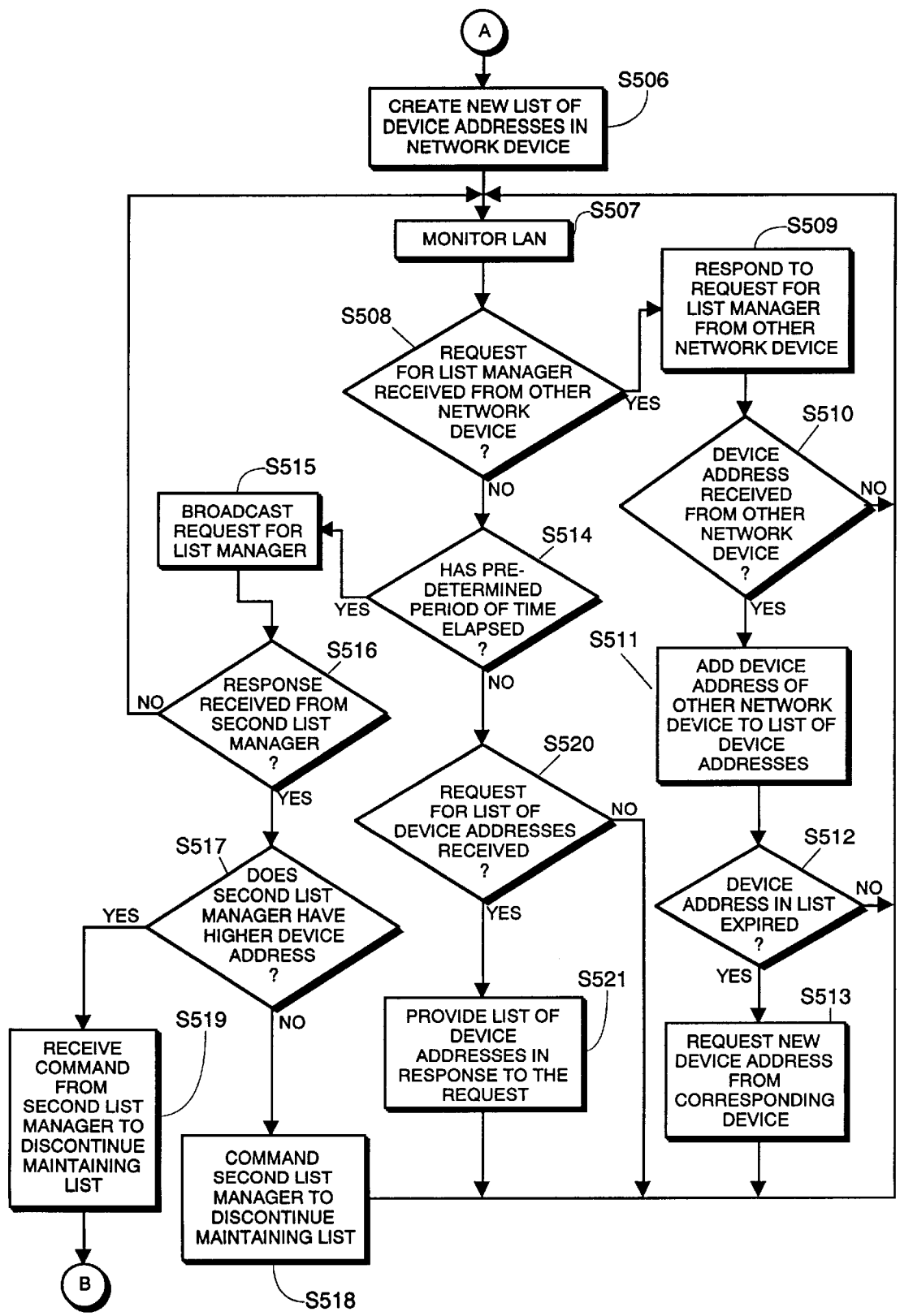

FIG. 5 is a flow diagram which shows process steps of the present invention for controlling a network device, such as NEB 2, NEB 4, NIB 9, NED 6, and NED 7. The process steps shown in FIG. 5 are stored in computer-readable media such as in EPROM 37 in the TCP/IP (NETBIOS or any other) protocol stack as shown in FIG. 4, and are executed by microprocessor 31 from DRAM 36 after being downloaded from EPROM 37.

Briefly, the process steps shown in FIG. 5 define an invention which controls a network device on LAN 1 to operate as a list manager which maintains a list of device addresses for LAN 1, or to operate as a slave which provides a device address of the network device to a list manager over LAN 1. The invention operates from an activated network device, such as NEB 2, to determine whether a list manager is operating on LAN 1, and to control the activated network device to operate as a slave on LAN 1 when it is determined that a list manager is operating on LAN 1. When it is determined that no list manager is operating on LAN 1, the invention controls the activated network device (i.e., NEB 2) to operate as the list manager for LAN 1.

Determining How to Control the NEB

With reference to FIG. 5, the present invention begins at step S501 with activation of NEB 2. Following activation, in step S502 NEB 2 broadcasts a request over LAN 1 to other network devices (e.g., NEB 4, NEDs 6 and 7, and NIB 9) to determine whether another network device on LAN 1 is operating as list manager for LAN 1. That is, NEB 2 broadcasts a request for a list manager to identify itself in order to determine whether another network device on LAN 1 is maintaining a list of device addresses in its memory.

Following the broadcast of the request for the list manager, NEB 2 waits a predetermined period of time for a response from the list manager in step S503. Preferably, this predetermined period of time is set beforehand in microprocessor 31, and can be modified as desired by the network administrator via CPUTIL. Once the predetermined period of time has elapsed and no response has been received from a list manager in step S504, processing proceeds to step S505, wherein it is determined whether NEB 2 has broadcasted its request for the list manager a predetermined number of times. As was the case with respect to the predetermined period of time above, the predetermined number of times is preferably set beforehand in microprocessor 31, and can be modified as desired by the network administrator via CPUTIL.

If step S505 determines that NEB 2 has not broadcasted its request for the list manager the predetermined number of times, processing returns to step S502, whereafter steps S502 to S505 are repeated the predetermined number of times.

Controlling the NEB to Operate as the List Manager

If it is determined in step S505 that NEB 2 has broadcasted its request for the list manager the predetermined number of times, NEB 2 confirms that no list manager is currently operating on LAN 1. Accordingly, processing proceeds to step S506, in which NEB 2 is designated as list manager for LAN 1. This is done by creating and storing a list of device addresses in a memory on. NEB 2, preferably in DRAM 36, as noted above. NEB 2 creates this list of device addresses by putting its own device address, retrieved from the NIF file in EPROM 37, at the top of the list.

After designating itself as list manager for LAN 1, processing proceeds to step S507 in which NEB 2 monitors LAN 1 for requests for the list manager broadcasted by other network devices, such as NED 6, on LAN 1. If, in step S508, NEB 2 receives a request for a list manager from another network device on LAN 1, processing proceeds to step S509 in which NEB 2 responds to the request from the other network device via LAN 1. In this response, NEB 2 identifies itself as list manager by transmitting an identification signal over the LAN. NEB 2's response to the other network device also includes NEB 2's device address, by which the other network devices on LAN 1 will know where to send a device address, and a call-back time period, the use for which is described below. Thereafter, NEB 2 waits for a device address from the other network device.

Step S510 determines whether NEB 2 has received a device address from another network device that issued a request for a list manager. In step S510, if NEB 2 does not receive a device address from the network device that issued the request, processing returns to step S507, in which NEB 2 continues to monitor LAN 1 for requests for a network device. If, on the other hand, NEB 2 receives the device address of the other network device, processing proceeds to step S511 in which NEB 2 adds the device address of that other network device to the list of device addresses in NEB 2. The device address is preferably added to the bottom of the list, although it may be added elsewhere as desired. As noted above, the device addresses for both NEB 2 and the other network devices may include device identification information, which is also stored in the list, as well as expiration times for each device address in the list.

In this regard, in step S512 microprocessor 31 monitors the list of device addresses in NEB 2 in order to determine whether any of the device addresses therein have expired. If no device addresses have expired, processing returns to step S507, wherein NEB 2 continues to monitor LAN 1. On the other hand, if a device address in the list of device addresses has expired, processing proceeds to step S513 in which microprocessor 31 requests, via LAN 1, a device address of a network device corresponding to a device address which has expired. For example, if NEB 2 determines, based on the expiration times in the list of device addresses, that the device address for NED 6 has expired, NEB 2 will issue a request to NED 6 over LAN 1 for NED 6 to provide NEB 2 with NED 6's current device address. Thereafter, NED 6, if operational, will provide NEB 2 with NED 6's address. If NED 6 does not respond within a predetermined period of time, NEB 2 may remove NED 6's address from the list of device addresses, or may store an indicator next to NED 6's device address so as to indicate that the address may not be current. In this manner, NEB 2 is able to keep its list of device addresses current.

Following step S513, processing returns to step S507, in which NEB 2 continues to monitor LAN 1. It should be noted that FIG. 5 shows NEB 2 monitoring expiration times in its list of device addresses after step S511 for the sake of simplicity only, and that NEB 2 may monitor expiration times in its list of device addresses at any point during processing.

Returning to step S508, if no request for the list manager has been received, processing proceeds to step S514. With respect to step S514, it is noted that the invention also contains a snoop timer. This snoop timer is used when NEB 2 is controlled to operate as the list manager in order to determine whether another list manager, other than NEB 2, is operating on LAN 1.

In this regard, step S514 determines whether a predetermined time period set by the snoop timer has elapsed. If the predetermined time period has elapsed in step S514, processing proceeds to steps S515 to S519 which determine whether a second list manager (i.e., a list manager other than NEB 2) is operating on LAN 1 and, in a case that a second list manager is operating on LAN 1, resolve contention between the second list manager and NEB 2.

To this end, step S515 broadcasts a request for a list manager from NEB 2 after the predetermined time period set by the snoop timer has elapsed in step S514. Next, in step S516, NEB 2 determines whether a response has been received from a second list manager, e.g., NED 6, operating on LAN 1. If no response is received from a second list manager within a predetermined period of time, processing returns to step S507. If, however, a response, which includes the device address of a second list manager, is received from the second list manager within the predetermined period of time, NEB 2 knows that a second list manager is operating on LAN 1. Accordingly, processing proceeds to step S517.

In step S517, NEB 2 determines whether the device address of the second list manager operating on the LAN is higher than its own device address. NEB 2 does this by comparing the device address provided to NEB 2 by the second list manager in step S516 to its own device address. If NEB 2 determines that its own device address is higher than the device address of the second list manager, processing proceeds to step S518 in which NEB 2 sends a command to the second list manager to discontinue maintaining its list of device addresses and to stop operating as list manager for LAN 1. If, however, NEB 2 determines that its device address is lower than that of the second list manager, processing proceeds to step S519, wherein NEB 2 stores the address of the second list manager, and waits for a command from the second list manager to discontinue maintaining its list and to stop operating as list manager for LAN 1.

In this regard, it should be noted that processing identical to that described above is also going on within the second list manager. Thus, the second list manager issues a command to NEB 2, which NEB 2 receives in step S519, the command instructing NEB 2 to discontinue maintaining its list of device addresses and to stop operating as list manager for LAN 1.

In the foregoing manner, the present invention reduces the period during which more than one list manager is operating on LAN 1 at the same time. It is noted that although the foregoing process is described with respect to resolving contention between two currently operating list managers, the process can be applied equally well when two network devices on a LAN are activated at roughly the same time. Moreover, the same process can be provided for more than two list managers operating on the same LAN.

Following step S519, NEB 2 is no longer operating as list manager for LAN 1, i.e., NEB 2 is operating as a slave on LAN 1. Accordingly, processing returns to step S502. Thereafter, NEB 2 periodically broadcasts requests for the list manager in order to determine whether the same list manager is still operating. This process is described in detail below.

Returning to step S514, if the predetermined time period maintained by the snoop timer has not elapsed, processing proceeds to step S520. In this regard, it is noted that steps S508, S514 and S520 are depicted in the foregoing order for the sake of simplicity only, and that these steps, in reality, need not be performed in the order set forth in FIG. 5.

In step S520 NEB 2 determines whether a peripheral on LAN 1, such as PC 26, has requested the list of device addresses stored in NEB 2. If, in step S520, NEB 2 determines that a peripheral has requested its list of device addresses, NEB 2 provides the peripheral with the list of device addresses in step S521. Thereafter, processing returns to step S507. A detailed description of processing performed in the peripheral on the list of device addresses provided by NEB 2 is provided below.

Controlling the NEB to Operate as a Slave

Returning to step S502, as noted above, when NEB 2 operates as a slave, it periodically broadcasts requests for the list manager in order to determine whether the identity of the list manager has changed. In this regard, as noted above, when NEB 2 determines that it is no longer list manager, it stores the address of the new list manager in a memory, preferably in DRAM 36. Thereafter, NEB 2 performs the following processing to determine whether a new list manager is operating on LAN 1, and to register itself with the new list manager, if necessary. At this point, it should be noted that the following processing is identical to that performed by NEB 2 following its initial power-up.

Thus, in step S502 NEB 2 broadcasts a request for a list manager to identify itself, and in step S503 NEB 2 waits a predetermined period of time for a response from the list manager. In the case that a list manager responds to the request to identify itself in step S504, processing proceeds to step S522.

Step S522 determines whether a new list manager (i.e., a list manager not known to NEB 2) is operating on LAN 1 by comparing a stored list manager device address to the device address provided in response to the broadcasted request for the list manager. If, in step S522, the stored device address of the list manager matches the device address provided in response to the broadcasted request, NEB 2 determines that the list manager for LAN 1 has not changed. Therefore, processing proceeds directly to step S523. However, if it is determined in step S522 that the stored device address of the list manager does not match the device address provided in response to the broadcasted request for the list manager, or alternatively that no list manager device address is stored (as would be the case when NEB 2 is initially powered-up), processing proceeds to step S524. In step S524, NEB 2 registers itself with the new list manager by providing its device address to the new list manager via LAN 1. As described above, the list manager adds the device address of NEB 2 to the list of device addresses maintained therein.

Following step S524, processing proceeds to step S523. In step S523, NEB 2 waits for a predetermined call-back time period before broadcasting a new request for a list manager. More specifically, as noted above, a list manager's response to a request from another network device includes a call-back time period. The call-back time period corresponds to a frequency at which devices on LAN 1 may issue requests for the list manager. The length of the call-back time period provided by the list manager is proportional to a length of a list of device addresses stored in the list manager. Thus, for example, the call-back time period increases proportionally to an increase in a number of device addresses in the list of device addresses maintained by the list manager.

In this regard, as the list of device addresses maintained by the list manager increases, the number of times the list manager must respond to re-broadcasted requests for the list manager also increases. The foregoing variation in the call-back time period is provided so as limit the frequency of responses that the list manager must make.

Thus, following step S523, in which NEB 2 waits for the call-back time period to elapse, processing returns to step S502. In step S502 a request for the list manager is re-broadcasted and the processing shown in FIG. 5 is repeated in the manner described above.

It is noted that in order for NEB 2, or any other list manager on LAN 1, to maintain a complete list of device addresses for LAN 1, it is necessary for all of the network devices on LAN 1 to include the process steps of the present invention. It is noted, however, that the present invention can still operate on a LAN having network devices which do not include the present invention. In such a case, the list of device addresses would be limited to those devices including the process steps of the present invention.

Accessing the List of Device Addresses

Figure 6:
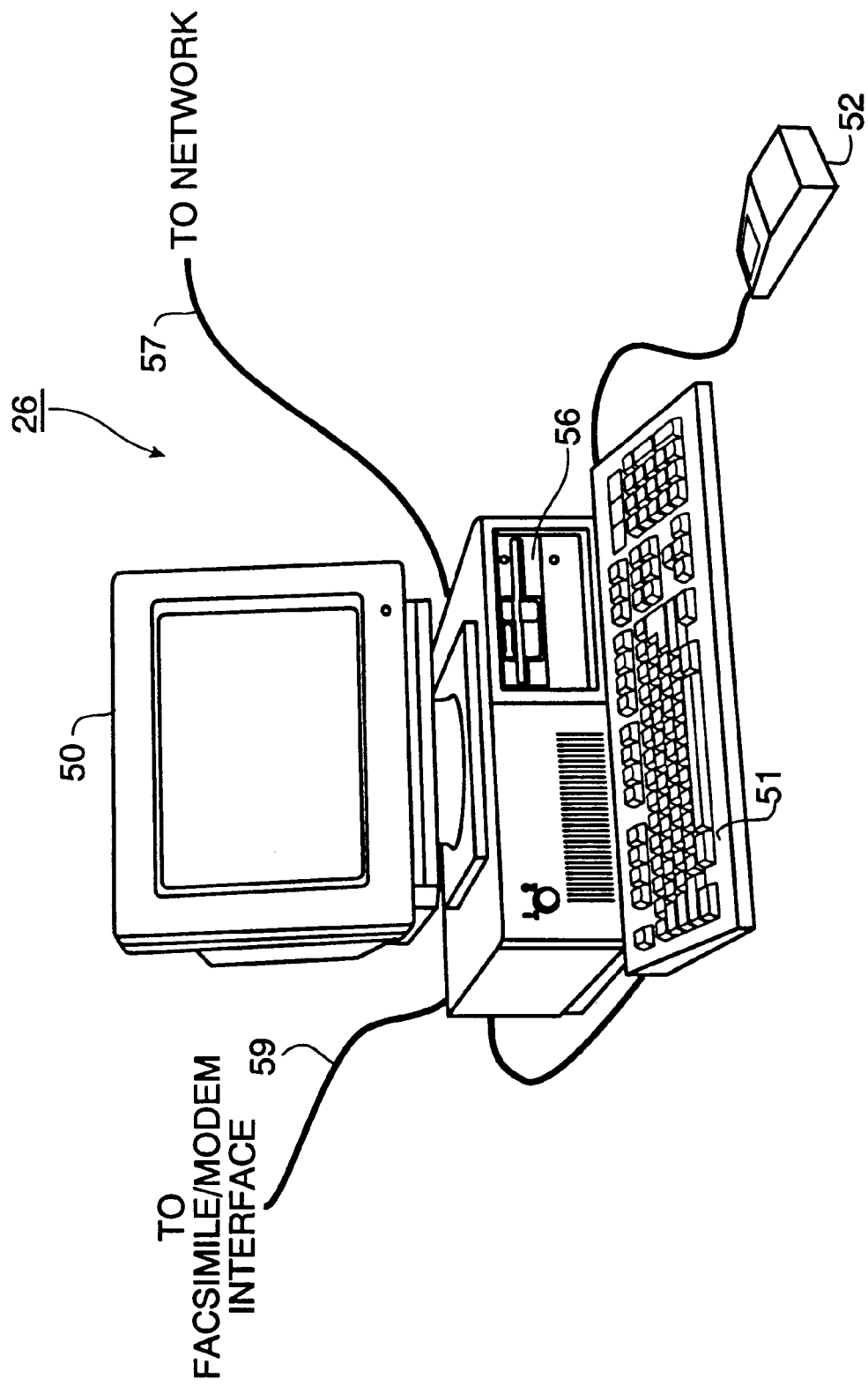
FIG. 6 shows a perspective view of computer hardware used by a peripheral to retrieve a list of device addresses maintained by a network device of the present invention.

As noted above, the present invention is used in connection with a network peripheral, such as PC 26 shown in FIG. 1. FIG. 6 is a view showing the outward appearance of PC 26, which is a peripheral that could be used in connection with the present invention. Shown in FIG. 6 is PC 26, such as a Macintosh or an IBM PC-compatible computer having a windowing environment such as Microsoft® Windows95. Provided with PC 26 is display screen 50, such as a color monitor, keyboard 51 for entering text data and programmer commands, and pointing device 52, such as a mouse, for pointing and for manipulating objects displayed on display screen 50. Also shown in FIG. 1 is network interface 57, which connects PC 26 to LAN 1.

PC 26 includes a mass storage device such as computer disk 54 (see FIG. 7) for storing a windowing operating system, such as Microsoft® Windows95, applications, such as a web browser (e.g., NETSCAPE, MOSAIC, etc.), platform independent applications, which may be written in the JAVA programming language, and process steps for communicating with the network devices (e.g., NEB 2, NEB 4, NED 6, NED 7, and NIB 9) on LAN 1. These process steps include steps to request a list of device addresses from the list manager. Operations of the process steps and platform independent applications are described in greater detail below.

PC 26 also includes floppy disk drive interface 56, into which floppy disks can be inserted. Information from such floppy disks can be downloaded to computer disk 54. Such information can include data files and application programs, such as the platform independent applications and the process steps mentioned above. PC 26 can also include a CD-ROM interface (not shown), from which information can also be downloaded to disk 54. Data may also be input into PC 26 from a variety of other sources such as network interface 57 which connects PC 26 to LAN 1, or from other external devices via facsimile/modem interface 59.

Figure 7:
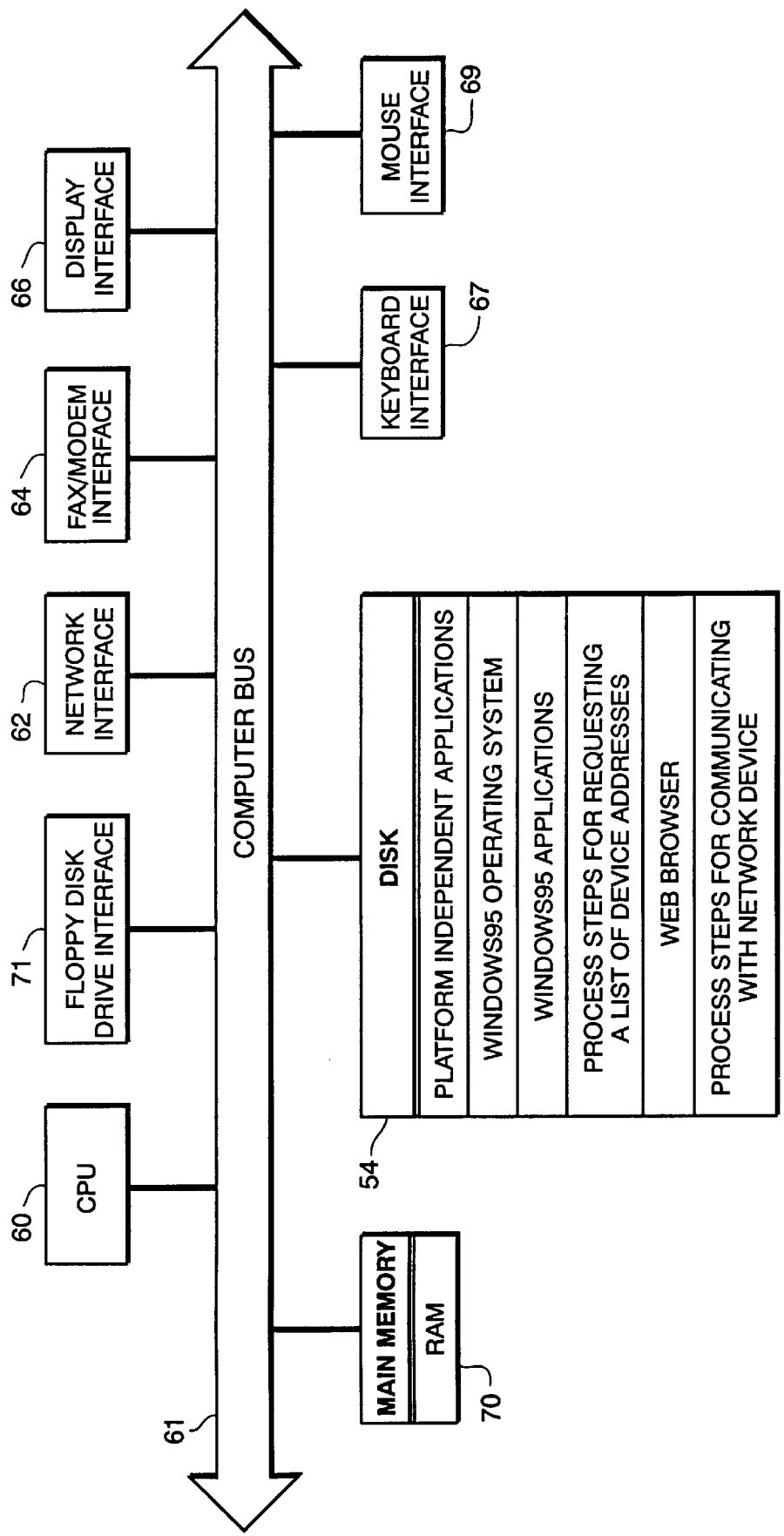
FIG. 7 shows a block diagram of the computer hardware depicted in FIG. 6.

FIG. 7 is a detailed block diagram showing the internal construction of PC 26. As shown in FIG. 7, PC 26 includes a central processing unit (hereinafter "CPU") 60 interfaced with computer bus 61. Also interfaced with computer bus 61 are network interface 62, fax/modem interface 64, display interface 66, keyboard interface 67, mouse interface 69, main memory 70, disk 54 and floppy disk drive interface 71.

Main memory 70 interfaces with computer bus 61 so as to provide random access memory storage for use by CPU 60 when executing stored program instructions such as Microsoft® Windows95, the platform independent applications and process steps mentioned above, a web browser, and other application programs. More specifically, CPU 60 loads those programs from disk 54, or alternatively, from a floppy disk in floppy disk drive interface 71, into main memory 70 and executes those stored programs out of main memory 70.

Briefly, the process steps for communicating with NEB 2 (or any other network device operating as list manager) stored in disk 54 include steps to broadcast a request over LAN 1 for the list manager, to receive, over LAN 1, a response to the request from NEB 2, to broadcast a request over LAN 1 for the list of device addresses in NEB 2, and to receive the list of device addresses from NEB 2 in response to the request for the list of device addresses.

In preferred embodiments of the present invention, NEB 2 responds to the request for the list of device addresses by providing its device address to PC 26 (or to any other peripheral that requests the list). PC 26 then uses the device address of NEB 2 to request the list of device addresses from NEB 2. It should be noted that PC 26 can also request the list of device addresses via LAN 1 without first broadcasting a request for the list manager and receiving the device address of the list manager. In any event, once PC 26 has received the list of device addresses from NEB 2, PC 26 may display and process the list as desired.

More specifically, PC 26 may execute a platform independent application to generate a display of the list of device addresses, and to display the device addresses on display screen 50.

Alternatively, the platform independent application may convert the device addresses to a readable form, e.g., to uniform resource locators (URLs), and display the converted list of device addresses on display screen 50. Along these lines, as noted above, the device addresses in the list may include device identification information. This information can be converted as well by the platform independent application, and displayed on display screen 50.

PC 26 may also use the list of device addresses and the identification information therefor to communicate with only devices on LAN 1 having predetermined device identification information. For example, if the device identification information for the device addresses in the list identifies a type of peripheral, e.g., a copier, a printer, a facsimile machine, etc., PC 26 may traverse the list of device addresses, select only those device addresses that correspond to printers, and communicate only with the printers. Along these lines, if the device addresses comprise E-Mail addresses of PCs on the network, PC 26 can select a subset of these peripherals based on identification information therefor, and send E-mail to the selected peripherals only.

Figure 9:
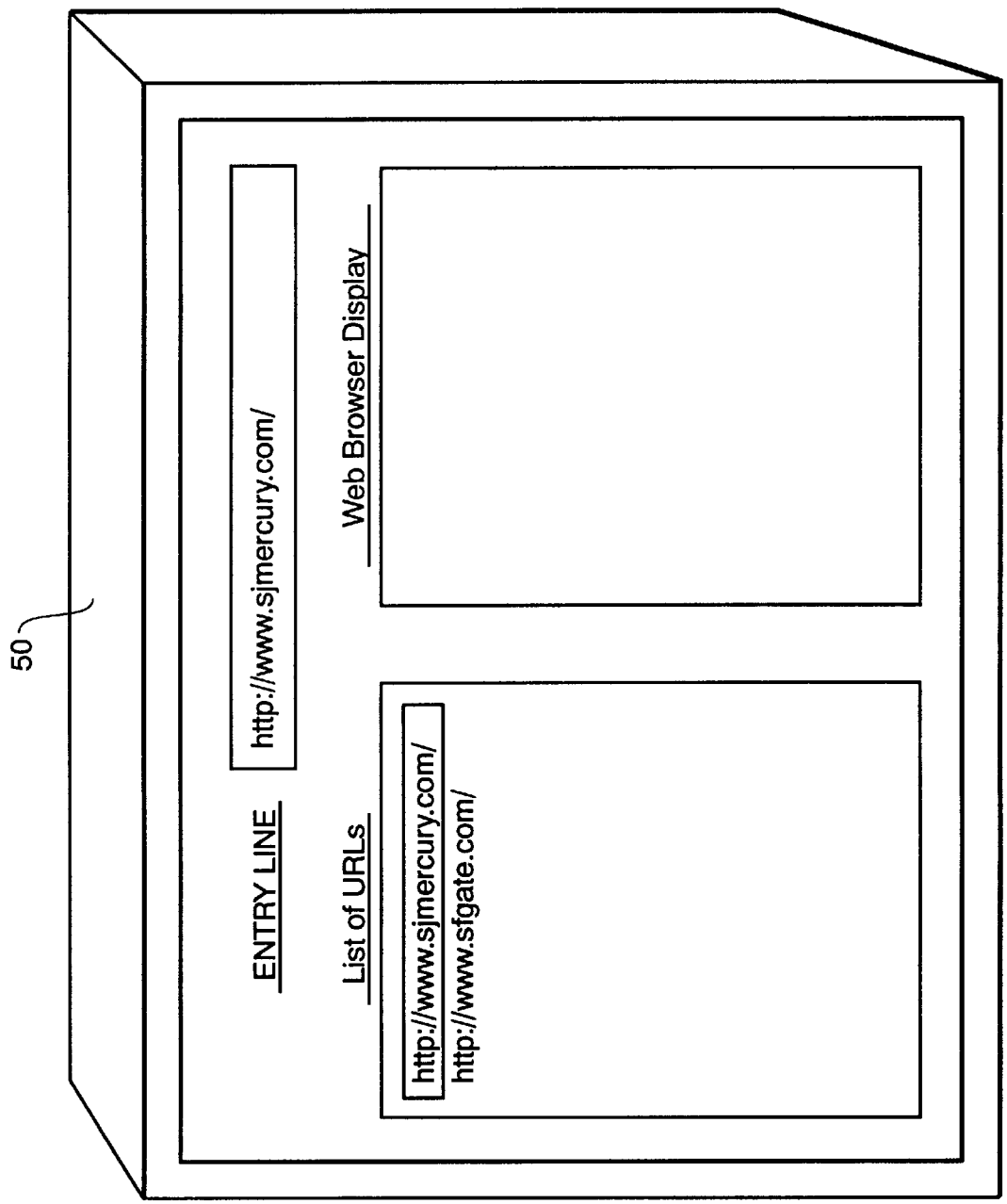
FIG. 9 shows a list of device addresses converted into uniform resource locators displayed alongside a web browser display.

In addition, the list of device addresses can be used in conjunction with a web browser. That is, a platform independent application can convert the list of device addresses into a list of URLs, and display the list of URLs. Thereafter, a web browser having a URL entry line can be executed by PC 26 and the entry line displayed on display screen 50. An example of this is shown in FIG. 9, which depicts a list of two device addresses converted into URLs and displayed on display 10. Thereafter, a platform independent application can be executed to display a URL in the web browser entry line in response to a selection of a URL in the displayed list, as also shown in FIG. 9.

It should be noted that the foregoing merely describes some of the many uses of the list of device addresses provided by the present invention, and should not be taken as limiting the invention in any way.

In this regard, the invention has been described with respect to a particular illustrative embodiment. It is to be understood that the invention is not limited to the above-described embodiment and that various changes and modifications may be made by those of ordinary skill in the art without departing from the spirit and scope of the invention.

What is claimed is:

1. A method of controlling a network device on a local area network (LAN) in which plural different network devices communicate over the LAN by transmitting broadcast packets that are not addressed to any one particular network device and by transmitting addressed packets that are addressed to a network device corresponding to a device address contained therein, the network device being controlled to operate as a list manager which maintains a list of device addresses for the LAN, and being controlled to operate as a slave which provides a device address of the network device to a list manager, the method comprising the steps of:

determining whether a list manager is operating on the LAN by transmitting a broadcast packet from the network device to request a list manager and by waiting for a response for a predetermined period of time after the broadcast packet has been transmitted, said determining step determining that no list manager is operating on the LAN if a response to the broadcast packet is not received by the network device after the predetermined period of time, and determining that a list manager is operating on the LAN if a response to the broadcast packet is received by the network device within the predetermined period of time;

controlling the network device to operate as a slave on the LAN when the determining step determines that a list manager is operating on the LAN, including controlling the network device to transmit an addressed packet to the list manager that includes the device address of the network device; and controlling the network device to operate as the list manager for the LAN when the determining step determines that no list manager is operating on the LAN, including controlling the network device to maintain a list of device addresses and to respond to a requestor's request for device addresses by transmitting an addressed packet containing device addresses to the requestor.

2. A method according to claim 1, wherein the step of controlling the network device to operate as the list manager comprises designating the network device as the list manager by storing a device address of the network device in a list of device addresses on the network device.

3. A method according to claim 2, wherein when the network device is controlled to operate as the list manager, the method further comprises the steps of:

monitoring the LAN via the network device for a request for a list manager broadcasted over the LAN; and responding to a request for a list manager on the LAN by broadcasting a response to the request from the network device, the response identifying the network device as the list manager.

4. A method according to claim 3, further comprising the steps of:

receiving, in the network device, a device address from the LAN; and storing the device address in the list of device addresses on the network device, the storing step storing the list of device address in a memory on the network device.

5. A method according to claim 1, wherein when the network device is controlled to operate as the list manager, the method further comprises:

a second determining step for determining whether a second list manager is operating on the LAN; and in a case that a second list manager is operating on the LAN, a resolving step for resolving contention between the second list manager and the network device designated as list manager.

6. A method according to claim 5, where the second determining step comprises the steps of:

broadcasting a request for a list manager over the LAN from the network device; and receiving, in the network device, a response to the request for a list manager from the second list manager.

7. A method according to claim 6, wherein the resolving step comprises:

a third determining step for determining which of the second list manager and the network device operating as list manager has a higher device address; and a designating step for designating a device having the higher device address as sole list manager for the LAN.

8. A method according to claim 7, wherein the response received from the second list manager includes a device address of the second list manager; and wherein the third determining step comprises comparing the device address of the second list manager to the device address of the network device operating as list manager in order to determine the higher device address.

9. A method according to claim 7, wherein the designating step comprises the step of broadcasting, over the LAN and from the network device having the higher device address, a command to a device having a lower device address to discontinue maintaining a list of device addresses.

10. A method according to claim 1, wherein the determining step comprises the step of repeating the broadcasting and waiting steps a predetermined number of times;

wherein the determining step determines that no list manager is operating on the LAN if a response to the request broadcasted over the LAN is not received by the network device after the repeating step broadcasts and waits the predetermined number of times; and wherein the determining step determines that a list manager is operating on the LAN if a response to the request broadcasted over the LAN is received by the network device in response to the repeating step.

11. A method according to claim 10, wherein when the determining step determines that a list manager is operating on the LAN, the method further comprises the step of re-broadcasting the request for the list manager periodically via the network device in order to determine whether the list manager is still operating.

12. A method according to claim 11, wherein a response from the list manager to the request broadcasted over the LAN includes a call-back time period; and wherein the re-broadcasting step re-broadcasts the request for the list manager at a frequency corresponding to the call-back time period provided by the list manager.

13. A method according to claim 12, wherein the call-back time period increases proportionally to an increase in a number of device addresses in the list of device addresses maintained by the list manager.

14. A method according to claim 11, wherein the request for the list manager broadcasted over the LAN comprises a request for a list manager operating on the LAN to identify itself and a response from the list manager includes a device address of the list manager; and wherein, the method further comprises the steps of:

storing the device address of the list manager in a memory on the network device; and determining, after each re-broadcast of the request by the re-broadcasting step, whether a new list manager is operating on the LAN by comparing a stored device address of the list manager to a device address provided in response to a re-broadcasted request.

15. A method according to claim 14, wherein if it is determined that a new list manager is operating on the LAN, the method further comprises the step of providing the device address of the network device to the new list manager.

16. A network device on a local area network (LAN) in which plural different network devices communicate over the LAN by transmitting broadcast packets that are not addressed to any one particular network device and by transmitting addressed packets that are addressed to a network device corresponding to a device address contained therein, the network device being controlled, the network device operating as a list manager for the LAN by maintaining a list of device addresses for the LAN, and operating as a slave on the LAN by providing a device address to another device on the LAN operating as the list manager, the network device comprising:

a memory which stores a device address of the network device and process steps for execution by a processor, and which can store the list of device addresses for the LAN;

a LAN interface which interfaces to the LAN, over which communications including broadcast packets and addressed packets are transmitted to and received from the LAN; and a processor which executes the process steps stored in the memory (1) to determine whether a list manager is operating on the LAN by transmitting a broadcast packet from the network device to request a list manager and by waiting for a response for a predetermined period of time after the broadcast packet has been transmitted, said determining step determining that no list manager is operating on the LAN if a response to the broadcast packet is not received by the network device after the predetermined period of time, and determining that a list manager is operating on the LAN if a response to the broadcast packet is received by the network device within the predetermined period of time, (2) to control the network device to operate as a slave on the LAN when the processor determines that a list manager is operating on the LAN, including controlling the network device to transmit an addressed packet to the list manager that includes the device address of the network device, and (3) to control the network device to operate as the list manager for the LAN when the processor determines that no list manager is operating on the LAN, including controlling the network device to maintain a list of device addresses and to respond to a requestor's request for device addresses by transmitting an addressed packet containing device addresses to the requestor.

17. A network device according to claim 16, wherein the processor controls the network device to operate as the list manager by storing the device address of the network device in a list of device addresses in the memory.

18. A network device according to claim 17, wherein when the processor controls the network device to operate as the list manager, the processor executes process steps stored in the memory to monitor the LAN via the LAN interface for a request for a list manager broadcasted over the LAN, and to respond to a request for a list manager on the LAN by broadcasting a response to the request via the LAN interface, the response identifying the network device as the list manager.

19. A network device according to claim 18, wherein the processor executes process steps stored in the memory to receive, via the LAN interface, a device address from the LAN, and to store the device address in the list of device addresses in the memory.

20. A network device according to claim 16, wherein when the processor controls the network device to operate as the list manager, the processor executes process steps stored in the memory to determine whether a second list manager is operating on the LAN, and in a case that a second list manager is operating on the LAN, to resolve contention between the second list manager and the network device designated as list manager.

21. A network device according to claim 20, wherein the processor determines whether a second list manager is operating on the LAN by broadcasting a request for a list manager over the LAN, and receiving a response to the request for a list manager from the second list manager.

22. A network device according to claim 21, wherein the processor resolves contention between the second list manager and the network device designated as list manager by determining which of the second list manager and the network device operating as list manager has a higher device address, and by designating a device having the higher device address as sole list manager for the LAN.

23. A network device according to claim 22, wherein the response received from the second list manager includes a device address of the second list manager; and wherein the processor determines which of the second list manager and the network device operating as list manager has a higher device address by comparing the device address of the second list manager to the device address of the network device operating as list manager.

24. A network device according to claim 22, wherein the processor designates a device having the higher device address as sole list manager for the LAN by broadcasting, over the LAN, a command to a device having a lower device address to discontinue maintaining a list of device addresses.

25. A network device according to claim 16, wherein the processor determines whether a list manager is operating on the LAN by repeating the broadcasting and waiting a predetermined number of times;

wherein the processor determines that no list manager is operating on the LAN if a response to the request broadcasted over the LAN is not received by the network device after the processor repeats broadcasting and waiting the predetermined number of times; and wherein the processor determines that a list manager is operating on the LAN if a response to the request broadcasted over the LAN is received by the network device in response to broadcasting the request for the list manager.

26. A network device according to claim 25, wherein when the processor determines that a list manager is operating on the LAN, the processor executes process steps stored in the memory to re-broadcast the request for the list manager periodically in order to determine whether the list manager is still operating.

27. A network device according to claim 26, wherein a response from the list manager to the request broadcasted over the LAN includes a call-back time period; and wherein the processor re-broadcasts the request for the list manager at a frequency corresponding to the call-back time period provided by the list manager.

28. A network device according to claim 27, wherein the call-back time period increases proportionally to an increase in a number of device addresses in the list of device addresses maintained by the list manager.

29. A network device according to claim 26, wherein the request for the list manager broadcasted over the LAN comprises a request for a list manager operating on the LAN to identify itself and a response from the list manager includes a device address of the list manager; and wherein the processor executes process steps stored in the memory to store the device address of the list manager in the memory, and to determine, after each re-broadcast of the request by the processor, whether a new list manager is operating on the LAN by comparing a stored device address of the list manager to a device address provided in response to a re-broadcasted request.

30. A network device according to claim 29, wherein if it is determined that a new list manager is operating on the LAN, the processor executes process steps stored in the memory to provide the device address of the network device stored in the memory to the new list manager.

31. Computer-executable process steps stored on a computer-readable medium, the computer-executable process steps to control a network device on a local area network (LAN) in which plural different network devices communicate over the LAN by transmitting broadcast rackets that are not addressed to any one particular network device and by transmitting addressed packets that are addressed to a network device corresponding to a device address contained therein, the network device being controlled to operate as a list manager which maintains a list of device addresses for the LAN, and being controlled to operate as a slave which provides a device address of the network device to a list manager, the computer-executable process steps comprising:

a determining step to determine whether a list manager is operating on the LAN by transmitting a broadcast packet from the network device to request a list manager and by waiting for a response for a predetermined period of time after the broadcast packet has been transmitted, said determining step determining that no list manager is operating on the LAN if a response to the broadcast packet is not received by the network device after the predetermined period of time, and determining that a list manager is operating on the LAN if a response to the broadcast packet is received by the network device within the predetermined period of time;

a controlling step to control the network device to operate as a slave on the LAN when the determining step determines that a list manager is operating on the LAN, including controlling the network device to transmit an addressed packet to the list manager that includes the device address of the network device; and a controlling step to control the network device to operate as the list manager for the LAN when the determining step determines that no list manager is operating on the LAN, including controlling the network device to maintain a list of device addresses and to respond to a requestor's request for device addresses by transmitting an addressed packet containing device addresses to the requestor.

32. Computer-executable process steps according to claim 31, wherein the controlling step controls the network device to operate as the list manager for the LAN by storing a device address of the network device in a list of device addresses on the network device.

33. Computer-executable process steps according to claim 32, wherein when the network device is controlled to operate as the list manager, the computer-executable process steps further comprise:

a monitoring step to monitor the LAN via the network device for a request for a list manager broadcasted over the LAN; and a responding step to respond to a request for a list manager on the LAN by broadcasting a response to the request from the network device, the response identifying the network device as the list manager.

34. Computer-executable process steps according to claim 33, further comprising:

a receiving step to receive, in the network device, a device address from the LAN; and a storing step to store the device address in the list of device addresses on the network device, the storing step storing the list of device address in a memory on the network device.

35. Computer-executable process steps according to claim 31, wherein when the network device is controlled to operate as the list manager, the computer-executable process steps further comprise:

a second determining step to determine whether a second list manager is operating on the LAN; and a resolving step to resolve, in a case that a second list manager is operating on the LAN, contention between the second list manager and the network device designated as list manager.

36. Computer-executable process steps according to claim 35, where the second determining step comprises:

a broadcasting step to broadcast a request for a list manager over the LAN from the network device; and a receiving step to receive, in the network device, a response to the request for a list manager from the second list manager.

37. Computer-executable process steps according to claim 36, wherein the resolving step comprises:

a third determining step to determine which of the second list manager and the network device operating as list manager has a higher device address; and a designating step to designate a device having the higher device address as sole list manager for the LAN.

38. Computer-executable process steps according to claim 37, wherein the response received from the second list manager includes a device address of the second list manager; and wherein the third determining step comprises a comparing step to compare the device address of the second list manager to the device address of the network device operating as list manager in order to determine the higher device address.

39. Computer-executable process steps according to claim 37, wherein the designating step comprises a broadcasting step to broadcast, over the LAN and from the network device having the higher device address, a command to a device having a lower device address to discontinue maintaining a list of device addresses.

40. Computer-executable process steps according to claim 31, wherein the determining step comprises a repeating step to repeat the broadcasting and waiting steps a predetermined number of times;

wherein the determining step determines that no list manager is operating on the LAN if a response to the request broadcasted over the LAN is not received by the network device after the repeating step broadcasts and waits the predetermined number of times; and wherein the determining step determines that a list manager is operating on the LAN if a response to the request broadcasted over the LAN is received by the network device in response to the repeating step.

41. Computer-executable process steps according to claim 40, wherein when the determining step determines that a list manager is operating on the LAN, the computer-executable process steps further comprise a re-broadcasting step to re-broadcast the request for the list manager periodically via the network device in order to determine whether the list manager is still operating.

42. Computer-executable process steps according to claim 41, wherein a response from the list manager to the request broadcasted over the LAN includes a call-back time period; and wherein the re-broadcasting step re-broadcasts the request for the list manager at a frequency corresponding to the call-back time period provided by the list manager.

43. Computer-executable process steps according to claim 42, wherein the call-back time period increases proportionally to an increase in a number of device addresses in the list of device addresses maintained by the list manager.

44. Computer-executable process steps according to claim 41, wherein the request for the list manager broadcasted over the LAN comprises a request for a list manager operating on the LAN to identify itself and a response from the list manager includes a device address of the list manager; and wherein, the computer-executable process steps further comprise:
a storing step to store the device address of the list manager in a memory on the network device; and
a determining step to determine, after each re-broadcast of the request by the re-broadcasting step, whether a new list manager is operating on the LAN by comparing a stored device address of the list manager to a device address provided in response to a re-broadcasted request.

45. Computer-executable process steps according to claim 44, wherein if it is determined that a new list manager is operating on the LAN, the computer-executable process steps further comprise a providing step to provide the device address of the network device to the new list manager.

46. A method according to claim 1, wherein the list of device addresses includes device addresses and corresponding device identification information for each device address.

47. A method according to claim 1, wherein the list of device addresses includes an expiration time for each device address, and wherein when the network device is controlled to operate as a list manager, the network device monitors expiration times and queries a device after expiration times have expired so as to obtain an updated device address.

48. A method according to claim 1, wherein the step of controlling the network device to operate as the list manager comprises the steps of:
receiving a broadcast request from a requester over the LAN, the broadcast request requesting a list manager;
responding to the broadcast request by providing the device address of the network device;
receiving an addressed packet from the requester requesting a list of device addresses; and
transmitting to the requester an addressed packet containing device addresses.

49. A network device according to claim 16, wherein the list of device addresses includes device addresses and corresponding device identification information for each device address.

50. A network device according to claim 16, wherein the list of device addresses includes an expiration time for each device address, and wherein when the network device is controlled to operate as a list manager, the network device monitors expiration times and queries a device after expiration times have expired so as to obtain an updated device address.

51. A network device according to claim 16, wherein the step of controlling the network device to operate as the list manager comprises the steps of:
receiving a broadcast request from a requestor over the LAN, the broadcast request requesting a list manager;
responding to the broadcast request by providing the device address of the network device;
receiving an addressed packet from the requester requesting a list of device addresses; and
transmitting to the requester an addressed packet containing device addresses.

52. Computer-executable process steps according to claim 31, wherein the list of device addresses includes device addresses and corresponding device identification information for each device address.

53. Computer-executable process steps according to claim 31, wherein the list of device addresses includes an expiration time for each device address, and wherein when the network device is controlled to operate as a list manager, the network device monitors expiration times and queries a device after expiration times have expired so as to obtain an updated device address.

54. Computer-executable process steps according to claim 31, wherein the step of controlling the network device to operate as the list manager comprises the steps of:
receiving a broadcast request from a requester over the LAN, the broadcast request requesting a list manager;
responding to the broadcast request by providing the device address of the network device;
receiving an addressed packet from the requester requesting a list of device addresses; and
transmitting to the requester an addressed packet containing device addresses.

* * * * *

UNITED STATES PATENT AND TRADEMARK OFFICE
CERTIFICATE OF CORRECTION

PATENT NO. : 6,021,429

DATED : February 1, 2000

INVENTOR : DAN DANKNICK

Page 1 of 3

It is certified that error appears in the above-identified patent and that said Letters Patent is hereby corrected as shown below:

IN THE DRAWINGS

Figure 5A, Step S524 "PROVICE DEVICE" should read --PROVIDE DEVICE--.

COLUMN 4

Line 40, "address" should read --addresses--.
Line 42, "an" should read --and--.
Line 58, ""outputting" should read --"Outputting--.

COLUMN 9

Line 57, "on." should read --on--.

COLUMN 11

Line 59, "S520" should read --S520,--.

COLUMN 13

Line 7, "view" should read --perspective view--.

UNITED STATES PATENT AND TRADEMARK OFFICE
CERTIFICATE OF CORRECTION

PATENT NO. : 6,021,429

DATED : February 1, 2000

INVENTOR : DAN DANKNICK

It is certified that error appears in the above-identified patent and that said Letters Patent is hereby corrected as shown below:

COLUMN 15

Line 46, "address" should read --addresses--.

COLUMN 19

Line 12, "rack-" should read --pack- --.

COLUMN 20

Line 5, "address" should read --addresses--.

COLUMN 21

Line 50, "requester" should read --requestor--.

COLUMN 22

Line 1, "requester" should read --requestor--.
Line 22, "requester" should read --requestor--.
Line 24, "requester" should read --requestor--.

UNITED STATES PATENT AND TRADEMARK OFFICE
CERTIFICATE OF CORRECTION

PATENT NO. : 6,021,429

DATED : February 1, 2000

INVENTOR : DAN DANKNICK

Page 3 of 3

It is certified that error appears in the above-identified patent and that said Letters Patent is hereby corrected as shown below:

<u>COLUMN 22</u>

Line 41, "requester" should read --requestor--.
Line 45, "requester" should read --requestor--.
Line 48, "requester" should read --requestor--.

Signed and Sealed this

Fifteenth Day of May, 2001

Attest:

NICHOLAS P. GODICI

Attesting Officer

Acting Director of the United States Patent and Trademark Office